Patented Dec. 6, 1932

1,889,960

UNITED STATES PATENT OFFICE

KARL HINTZMANN, OF LEVERKUSEN, GERMANY, ASSIGNOR TO I. G. FARBENINDUSTRIE AKTIENGESELLSCHAFT, OF FRANKFORT-ON-THE-MAIN, GERMANY

PROCESS FOR INCREASING THE SOLUBILITY OF WATER-SOLUBLE SALTS

No Drawing. Application filed September 5, 1930, Serial No. 479,920, and in Germany September 25, 1929.

The present invention relates to the dissolution of water-soluble salts.

I have found that the capacity of water of dissolving water-soluble organic or inorganic salts is appreciably increased when the water or the substances to be dissolved therein, or both, are incorporated with a urea such as urea or a water-soluble derivative thereof, such as thiourea, before or during the dissolution. Not only is an amount of water which is considerably less than corresponds to the solubility of the components in water necessary for complete solution, but also at the same time dehomogenization of the mixture, or crystallization of difficulty soluble solid components, is prevented and stable supersaturated solutions are obtained.

According to this invention it is possible to prepare aqueous solutions with a very high concentration of different salts having a limited solubility in water, by the addition of urea or, for example, thiourea. The employment of such concentrated solutions instead of solid substances is simpler in many cases and in particular facilitates the rapid further dissolution of a product in water. For example, the employment of highly concentrated solutions of fire extinguishing agents such as alkaline, i. e. alkali metal or ammonium, salts of sulphonic acids of aromatic, preferably polynuclear, hydrocarbons such as alkylated naphthalenes, aluminium sulphate, phosphates, bicarbonates and the like which are usually applied in the form of aqueous solution, is of very considerable importance. In this case, instead of supplying the extinguishing apparatus with solid fire extinguishing agents, they are supplied with highly concentrated (supersaturated) solutions according to the present invention which are capable of being diluted without the slightest delay. Moreover, the mixtures according to the present invention are stable to cold in a large degree.

The quantity of the urea employed is generally at least 10 per cent of the salt to be dissolved, quantities of from 20 to 60 per cent being usually employed. These quantities may be further increased as desired but in most cases quantities as high as 100 per cent are not necessary. If desired, ammonia may be added for increasing the resistance to freezing or any other antifreezing agent.

The following examples will further illustrate the nature of this invention, but the invention is not restricted to these examples. The parts are by weight.

Example 1

34.5 parts of butyl naphthalene sulphonic sodium salt are intimately mixed with 17.2 parts of urea, preferably by employing a suitable mill. This mixture is dissolved in 48.3 parts of warm water. A clear viscous solution is obtained which is readily miscible with water and can be advantageously employed for fire extinguishing purposes, for example in accordance with the application for Letters Patent No. 234,223 filed March 7th, 1929. Instead of the said sodium salt the ammonium salt may be employed in which case the quantity of water may be reduced to about 40 parts; a similar mixture may consist of 40 parts of the said ammonium salt, 20 parts of urea, 26.5 parts of water and 13.5 parts of an aqueous 25 per cent solution of ammonia, which mixture is stable at 15° C. below zero.

Example 2

800 parts of magnesium sulphate are mixed with 400 parts of urea and dissolved in 1000 parts of water. The magnesium sulphate does not crystallize out from the resulting solution even after standing for a long period of time, and the solution can be advantageously employed for loading textile materials.

What I claim is:—

1. Supersaturated aqueous solutions of water-soluble salts comprising a water-soluble salt, a quantity of water insufficient for its dissolution, and a substance selected from the group of urea and its water-soluble derivatives.

2. Supersaturated aqueous solutions of water-soluble salts comprising a water-soluble salt, a quantity of water insufficient for its dissolution, and from 10 to 100 per cent, by weight of the said salt, of a substance selected from the group of urea and its water-soluble derivatives.

3. Supersaturated aqueous solutions of water-soluble salts comprising an alkaline salt of an alkyl-naphthalene sulphonic acid, a quantity of water insufficient for its dissolution, and from 20 to 60 per cent, by weight of the said salt, of a substance selected from the group of urea and its water-soluble derivatives.

4. Supersaturated aqueous solutions of water-soluble salts comprising an ammonium salt of an alkyl-naphthalene sulphonic acid, a quantity of water insufficient for its dissolution, and from 20 to 60 per cent, by weight of the said salt, of urea.

5. Supersaturated aqueous solutions of water-soluble salts comprising an ammonium salt of an alkyl-naphthalene sulphonic acid, a quantity of water insufficient for its dissolution, ammonia and from 20 to 60 per cent, by weight of the said salt, of urea.

6. Supersaturated aqueous solutions of water-soluble salts comprising a butyl naphthalene sulphonic acid ammonia salt, a quantity of water insufficient for its dissolution, and from about 20 to 50 per cent, by weight of the said salt, of urea.

In testimony whereof I have hereunto set my hand.

KARL HINTZMANN.